United States Patent
Amendt et al.

(10) Patent No.: US 7,056,262 B2
(45) Date of Patent: Jun. 6, 2006

(54) METHOD AND APPARATUS FOR THE CONTROL OF CHARACTERISTIC OPERATING VALUES OF A POWER TRAIN

(75) Inventors: Oliver Amendt, Renningen (DE); Peter Bührle, Ettlingen (DE); Mario Jung, Sinzheim (DE); Jürgen Gerhart, Appenweier (DE); Johannes Moosheimer, Bühe (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/326,853

(22) Filed: Dec. 20, 2002

(65) Prior Publication Data

US 2003/0148852 A1    Aug. 7, 2003

Related U.S. Application Data

(63) Continuation of application No. PCT/DE01/02156, filed on Jun. 7, 2001.

(30) Foreign Application Priority Data

Jun. 23, 2000   (DE)   ................................ 100 30 836

(51) Int. Cl.
   *F16H 59/64*   (2006.01)
   *B60K 41/02*   (2006.01)

(52) U.S. Cl. .......................... 477/98; 477/76; 477/174

(58) Field of Classification Search ............. 477/97–8, 477/107, 110, 902, 174–6, 180–1, 76, 156, 477/83, 90, 98
   See application file for complete search history.

(56) References Cited

U.S. PATENT DOCUMENTS

| 4,930,079 | A |   | 5/1990  | Kondo |
| 5,577,580 | A | * | 11/1996 | Polzin et al. ................ 477/98 |
| 5,611,752 | A | * | 3/1997  | Kamada et al. ............. 477/98 |
| 5,643,136 | A | * | 7/1997  | Kono et al. ................. 477/98 |
| 5,830,106 | A | * | 11/1998 | Abe ............................. 477/98 |
| 5,871,419 | A |   | 2/1999  | Amendt |
| 5,876,306 | A | * | 3/1999  | Murata ...................... 477/175 |
| 5,960,669 | A | * | 10/1999 | Ohashi et al. .............. 477/98 |
| 5,976,057 | A | * | 11/1999 | Mori ......................... 477/150 |
| 5,993,355 | A | * | 11/1999 | Nordg.ang.rd ............ 477/174 |
| 6,024,668 | A | * | 2/2000  | Holbrook et al. .......... 477/98 |
| 6,026,921 | A | * | 2/2000  | Aoyama et al. .......... 180/65.2 |
| 6,095,946 | A | * | 8/2000  | Maguire et al. ........... 477/98 |

(Continued)

FOREIGN PATENT DOCUMENTS

EP    0 760 443 B1    5/2000

(Continued)

*Primary Examiner*—Roger Pang
(74) *Attorney, Agent, or Firm*—Darby & Darby (57) ABSTRACT

A first characteristic operating value, for example the amount of transmissible clutch torque, in a motor vehicle power train with an engine is controlled by using at least a second characteristic value. The second characteristic value is subject to adaptation, if necessary, during an operating phase of the motor vehicle. The method steps are:
   starting the engine; and
   assuring that for a predetermined first time period after starting the engine, the first characteristic operating value is controlled independently of the second characteristic value, wherein the predetermined first time period depends on at least one predetermined third characteristic operating value.

6 Claims, 7 Drawing Sheets

U.S. PATENT DOCUMENTS

| | | | |
|---|---|---|---|
| 6,152,275 A * | 11/2000 | Fischer et al. | 477/176 |
| 6,364,811 B1 * | 4/2002 | Hubbard et al. | 477/143 |
| 6,385,520 B1 * | 5/2002 | Jain et al. | 701/51 |
| 6,468,182 B1 * | 10/2002 | Brandt et al. | 477/98 |
| 6,829,528 B1 * | 12/2004 | Kang et al. | 701/54 |
| 2003/0130088 A1 * | 7/2003 | Schiele | 477/39 |

FOREIGN PATENT DOCUMENTS

| | | |
|---|---|---|
| EP | 0 937 919 B1 | 10/2001 |
| JP | 406272754 A * | 9/1994 |
| JP | 407019332 A * | 1/1995 |
| JP | 2000154867 A * | 6/2000 |

* cited by examiner

METHOD AND APPARATUS FOR THE CONTROL OF CHARACTERISTIC OPERATING VALUES OF A POWER TRAIN

CROSS REFERENCE TO RELATED APPLICATIONS

This application is a continuation of International Application Ser. No. PCT/DE01/02156, filed Jun. 7, 2001 and published in German on Dec. 27, 2001 under the International Publication Number WO 01/98679 A2, which is still pending, and which claims priority from German Patent Application No. 100 30 836.8, filed Jun. 23, 2000, all of which are hereby incorporated by reference in their entirety.

BACKGROUND OF THE INVENTION

The invention relates to a method of controlling a characteristic operating value of a motor vehicle power train, and it also relates to a control device for the control of at least one characteristic operating value of a motor vehicle power train.

A motor vehicle power train in the sense of the present invention is composed in particular of the devices that are arranged in the path along which the power is transmitted between the drive source and the driven wheels or driven axles of the motor vehicle, where the drive source is in particular a combustion engine or a motor of the vehicle. In the present context, the scope of the devices that make up a power train is used with a broad meaning, so that control devices used to control the functional parts of the power train according to the present invention will be considered part of the power train.

A characteristic operating value in the sense of the present invention is a value that can vary in magnitude during operation, particularly in the operation of a motor vehicle.

A characteristic operating value of a motor vehicle power train in the sense of the present invention is in particular a characteristic value of a device that belongs to the motor vehicle power train and that can vary in magnitude during operation.

Methods as well as devices for controlling a characteristic operating value of a motor vehicle power train are known among the existing state of the art.

OBJECT OF THE INVENTION

The object of the present invention is to propose a new and different method as well as a new and different control device for controlling a characteristic operating value of a motor vehicle power train.

One specific aim of the invention is to create methods as well as a control apparatus for controlling a characteristic operating value of a motor vehicle power train that result in improved operating safety of a motor vehicle and can be realized in a cost-effective manner and with a low level of technical complexity.

SUMMARY OF THE INVENTION

The foregoing objective is achieved in a method for controlling at least one characteristic operating value of a motor vehicle power train with at least one of the steps or features that are proposed in the following description or in the claims or are illustrated in the drawings.

A solution to meet the objective is further offered by a control device for controlling a characteristic operating value of a motor vehicle power train with at least one of the features that are proposed in the following description or in the claims or are illustrated in the drawings.

A solution is offered in particular by a method of controlling a first characteristic operating value of a motor vehicle power train, wherein the control of the first characteristic operating value under certain conditions is performed by using at least a second characteristic value, and wherein the second characteristic value is adapted if necessary during the operating phase of the motor vehicle when the second characteristic operating value is being used. The method assures that for a predetermined first time period after starting the engine of a motor vehicle, the first characteristic operating value is controlled independently of the second characteristic operating value as the latter may during that time period be subject to adaptation.

The operating phase of the power train or of the motor vehicle as whole in the sense of the present invention is initiated by switching the ignition of the engine into the on-position, and the operating phase is terminated by switching the ignition to the off-position.

The first characteristic operating value is in particular the target value for the clutch torque, or the transmissible clutch torque, or the actuating position of the clutch device.

The second characteristic value, which can in some cases be a characteristic operating value, is in particular the contact point position or the friction coefficient of a clutch device.

The contact point of a clutch device in the sense of the present invention is in particular a position of the clutch device or of a clutch-actuating device where the clutch is at the point of becoming engaged and is able to transmit a predetermined small amount of torque.

The friction coefficient of the clutch device is in particular the friction coefficient that exists between the friction surfaces of a friction clutch.

According to the invention, the length of the first time period depends on a predetermined third characteristic operating value.

The third characteristic operating value is in particular the temperature of the engine cooling fluid or the oil temperature or the engine rpm-rate of the motor vehicle.

With preference, the first time period coincides with the so-called warm-up phase of the engine, or it coincides with an extended warm-up phase that includes a predetermined time delay, also referred to as offset period.

During the warm-up phase of the engine, certain characteristic operating values are controlled differently from the subsequently used control characteristic. In particular, the warm-up control characteristic takes into account that the engine usually has markedly lower temperatures after the start than during subsequent periods of the same operating phase.

In particular, during the warm-up phase the engine rpm-rate is increased or the fuel mixture is richer or the spark advance is set differently from the subsequent periods of the same operating phase. In a richer fuel mixture, the proportion of fuel to air is larger than in a leaner mixture. The engine rpm-rate, and in particular the idling rate, is preferably increased by 250 to 450 rpm during the warm-up phase.

In the first time period of an operating phase, the second characteristic value that is subject to adaptation during this time period is not used for the control of the first characteristic operating value, or the adaptations of the second characteristic values are blocked or not carried out. A combination of these possibilities during the first time period is likewise among the preferred embodiments of the invention. In particular, the invention proposes the concept that the first time period includes a second time period as well as a third time period that is different from the second time period. During the second time periods adaptations of the second characteristic values are either avoided or not carried out, while in the third time period, adaptations of the second characteristic values are carried out, but the adapted values are not used for controlling the first characteristic operating value.

The respective lengths of the first and/or third time periods can be different or they can remain unchanged over different operating phases.

As a particularly preferred concept to control the first characteristic operating value during the first time period, predefined stored values are used for the second characteristic operating value instead of using the adapted values. The stored values can for example be the last adapted or last used values of the preceding operating period, or they can be values that are specifically provided for use during the first time period of different operating phases.

Preferably, the first time period is composed of the second time period and the third time period that adjoins the second time period.

As a further preferred concept, the duration of the first time period is different from the duration of the warm-up phase. It is in particular proposed for the first time period to coincide with the warm-up phase extended by a predetermined time delay.

The duration of the warm-up phase can be the same or it can differ between different operating phases. As a preferred concept, the duration of the warm-up phase depends on a fourth characteristic operating value which in some cases may be the third characteristic operating value. The fourth characteristic operating value is in particular the temperature of the cooling fluid or the oil temperature of the motor vehicle.

The duration of the warm-up phase, or of a fourth time period that begins with the starting of the engine, is already defined at the time when the engine is started or is determined after starting the engine, possibly dependent on the fourth characteristic operating value.

During the fourth time period, or during the warm-up phase and an immediately following time period, the engine or the power train is controlled in accordance with different characteristics including a warm-up characteristic. Preferably, the third time period extends up to the point where a predetermined third characteristic operating value such as the cooling fluid temperature has reached, exceeded or fallen below a predetermined threshold value for the third characteristic operating value. With preference, the warm-up phase lasts up to the point where the predetermined fourth characteristic operating value, which in some cases likewise represents the cooling fluid temperature, has reached, exceeded or fallen below a predetermined threshold value for the fourth characteristic operating value.

Preferably, the warm-up phase extends to the point where the fourth characteristic operating value has reached a predetermined threshold value. The adaptation lock, i.e., the blocking of adaptations of the second characteristic operating value or the controlling of the first characteristic operating value independent of second characteristic values that are subject to adaptation in the same operating phase, is likewise tied to the condition of reaching the predetermined threshold value. As a further preferred concept, the adaptation-locking period extends through the warm-up phase as well as an immediately following delay period. The time-delay period, likewise, is preferably tied to a predetermined threshold value of the third or fourth characteristic value, or it is a fixed time period. For example, the warm-up phase may extend to the point where the cooling fluid temperature has reached or exceeded 40° C., and the adaptation-locking period lasts until the cooling fluid temperature has reached or exceeded 43° C.

It is further preferred to keep the adaptation lock in effect as long as the engine runs at an increased rpm-rate, i.e., in accordance with a warm-up characteristic.

The adaptation-locking time period can further be extended by a predetermined time delay period, also referred to as an offset period.

The term adaptation lock in the sense of the present invention means in particular that adapted second characteristic operating values that were subject to adaptation during the same operating period are not used for the control of the first characteristic operating value, or that adaptations of the second characteristic operating values are blocked. The adaptation-locking period in the sense of the present invention is in particular the time period during which an adaptation lock is in effect.

The invention provides in particular a method of controlling at least one fifth characteristic operating value of a motor vehicle power train, where the latter has at least one actuating device that serves to exert at least an influence over the transfer ratio of the transmission device.

The aforementioned actuating device preferably includes an operator control element such as a shift lever, and also a connecting device that connects the shift lever to the transmission device, so that a manipulation of the shift lever is translated by way of the connecting device into a corresponding actuation of the transmission.

In predetermined positions of the actuating device, the inventive method provides that the engagement state of the clutch device is changed. The concept of the actuating position in the sense of the present invention is to be understood with a broad range of meanings. The terminology "position of the actuating device" means in particular a predetermined position of a shift lever or a predetermined variable distance between two points of the actuating device. With preference, the connecting device includes a cable that stretches elastically in response to predetermined movements or forces applied to the shift lever. Different states of stretching of this cable, i.e., changes of the distance between two points, are considered under the present invention as positions of the actuating device.

The positions of the actuating device where the engagement state of the clutch device is changed, i.e., where the clutch is brought into or taken out of engagement, are in the present context referred to as disengagement thresholds.

In accordance with the invention, the disengagement thresholds are stored in memory.

In accordance with the invention, the stored disengagement thresholds are adapted through an emergency adaptation during an operating phase of the motor vehicle, if predetermined third conditions are present. Such third conditions are in particular predetermined malfunctions in the transmission, defective components, unwanted loss of adjustment of the transmission or the actuating device, or similar conditions that have the effect that the stored disengagement thresholds deviate by more than a predetermined tolerance limit from the positions of the actuating device at which the engagement state of the clutch device is actually changed, i.e., where the clutch is taken out or moved into engagement as a result of a shift lever movement.

As a further concept of the invention, at least one disengagement threshold is adapted at the end of the operating phase of the motor vehicle if certain predetermined fourth conditions are present. The predetermined fourth conditions relate in particular to a situation where the number of gear shifts during the operating phase is larger than a predetermined limit value. In the adaptation of the stored disengagement thresholds, the change of the stored disengagement thresholds is limited to a first predetermined maximum value if no emergency adaptation took place during the operating phase of the motor vehicle. As a preferred concept, if the disengagement threshold is found out of adjustment by more than the aforementioned maximum value during the adaptation of the disengagement threshold at the end of the operating phase, a new disengagement threshold is stored that deviates by the predetermined maximum value.

If an emergency adaptation was performed during the operating phase, the change of the disengagement thresholds that is allowed during the adaptation that is carried out at the end of the operating phase is limited to a second maximum value. This second maximum value is preferably a finite value that is larger than the fist maximum value.

For example, the first maximum value may be 10 increments and the second maximum value may be 25 increments on a linear scale of clutch travel displacement, but these exemplary values should not be taken as limitations of the invention.

Further proposed under the invention is in particular a method of controlling at least one fifth characteristic operating value of a motor vehicle power train in which stored disengagement thresholds are adapted through an emergency adaptation if predetermined third conditions are present. The fifth characteristic operating value is in particular the engine rpm-rate of the engine torque or the transmissible torque of the clutch device or the target value for the clutch torque or a signal that causes the state of engagement of the clutch to change, or the transfer ratio of a transmission device in a power train, or some other characteristic value.

According to the invention, the change of the stored disengagement thresholds that is possible during an adaptation is limited to a predetermined first maximum value if no emergency adaptation took place during the operating phase of the vehicle, if predetermined fourth conditions are present. If an emergency adaptation took place during the operating phase of the motor vehicle, the change is limited to a second maximum value for those disengagement thresholds that were subject to an emergency adaptation during the operating phase, or for a group of disengagement thresholds containing at least one threshold that was subject to an emergency adaptation during the operating phase. As an alternative to limiting the change to a second maximum value, one could also allow an unlimited change for a disengagement threshold that was subject to an adaptation during the preceding operating phase, or for the group of disengagement thresholds containing a threshold that underwent an adaptation in the preceding operating phase.

With particular preference, the limitation to the first maximum value is continued for adaptation changes of those disengagement thresholds that had no emergency adaptation during the preceding operating phase or do not belong to a group containing a threshold that was subject to an emergency adaptation during the preceding operating phase.

There are a variety of preferred criteria for assigning a disengagement threshold to a group. With particular preference, a group of disengagement thresholds is assigned to those gears of the transmission whose engagement tracks are arranged on the same side of the selector track in the customary shift-gate pattern of a manual stick-shift transmission. However, this particular choice of assigning disengagement thresholds to groups should not be taken as a limitation of the invention.

The invention further proposes in particular a method of controlling a fifth characteristic operating value of a motor vehicle power train wherein during the operating phase of the motor vehicle under predetermined third conditions at least one stored disengagement threshold is adapted through an emergency adaptation. If none of the stored disengagement thresholds was adapted during an emergency adaptation and if further during the operating phase at least n gear changes were performed in the transmission, an adaptation of the stored disengagement thresholds is performed at the end of the operating phase. The symbol n stands for a predetermined positive integer. If during the operating phase at least one stored disengagement threshold was adapted through an emergency adaptation and if at least k gear changes of the transmission were carried out during the operating phase, an adaptation of the stored disengagement thresholds is made at the end of the operating phase of the vehicle. The symbol k stands for a positive integer that is smaller than n. Thus, the number of gear changes that leads to an adaptation of the disengagement thresholds after the operating phase is reduced if an emergency adaptation was performed during the operating phase. With special preference, the numbers n or k required to cause an adaptation represent a number of gear changes involving one specific gear level, or all gear levels, or a specific group of gear levels of the transmission.

The number of gear changes required to cause an adaptation of one or more disengagement thresholds at the end of an operating phase are thus preferably dependent on specific gears or groups of gears.

According to a preferred embodiment of the invention, n and k are selected as n=6 and k=3.

The invention provides in particular the concept that an emergency adaptation is performed during an operating phase of the motor vehicle if predetermined third conditions are present in regard to at least one gear level or the disengagement threshold assigned to the gear level, in which case the emergency adaptation is performed either only for the gear level where the third predetermined conditions were detected, or for all gear levels.

The stored disengagement thresholds are used preferably for controlling the clutch device and/or the transmission device, in particular in the context of a detection system that recognizes when the driver intends to shift gears.

According to a preferred embodiment of the invention, a position sensor is arranged at the transmission for the function of detecting a movement or a position of the transmission device, and at least one other position sensor is arranged in the area of the shift lever or the shift gate for the purposes of detecting the movement or position of the shift lever.

The movements of the shift lever and the transmission are coupled to each other through the connecting device, but the positional correlation between the shift lever and the transmission is subject to elastic deformations in the connecting device. If the sensor device on the transmission and the sensor device on the shift lever indicate different values or different travel displacements for a predetermined shift process, it is particularly preferred to use this as an indication that a predetermined deformation is present in the connecting device. If the predetermined deformation is larger than a predetermined threshold deformation, this is taken as an indication that the driver intends to shift gears. This threshold deformation is in particular referred to a disengagement threshold within the context of the present invention. When the disengagement threshold is reached, this will in particular have the effect that the clutch device is taken out of engagement. The threshold deformation and the arrangement for its detection are designed advantageously in such a manner that the threshold deformation occurs when the shift lever is moved towards the selector track or neutral track from a position of a fully engaged gear at the end of an engagement track.

With particular preference, the adaptation or emergency adaptation of the stored disengagement thresholds is performed automatically. As a preferred concept, each of the gear levels of the transmission device has a disengagement threshold assigned to it.

The correlation between a specific gear level of the transmission device and the disengagement threshold assigned to that gear level can preferably be made automatically.

In accordance with a particularly preferred embodiment, two position sensors are arranged in the area of the shift lever, with a first sensor serving to detect movements or positions of the shift lever or a connected component relative to the direction of the shift tracks and a second sensor serving to detect movements or positions relative to the direction of the selector track.

Preferably, the connection device contains a cable that is elastically stretched as a result of certain shift processes. The cable is in particular a wire rope or a rope of some other material.

The invention provides in particular that deviations between the respective values indicated by the first and second sensor devices are used as an indication for the presence and magnitude of deformations in the connecting device, in particular elastic deformations. The respective values measured by the position sensors at the transmission and the shift lever could be normalized so that the difference between the values corresponds directly to the deformation. As a preferred concept, a predetermined amount of difference or threshold difference between the first and second sensor signals is used to represent the disengagement threshold. It should be noted that the respective signal values of the first and second position sensor devices are preferably normalized.

As a particularly preferred concept, a third condition—i.e., a condition for adapting a stored disengagement threshold during an operating phase of the motor vehicle—exists if an intention to shift gears has been indicated longer than a predetermined sixth time period. The predetermined sixth time period is, e.g., 2 seconds, but this example should not be taken as a limitation of the invention. A condition where an intention to shift is indicated beyond a predetermined sixth time period (permanent indication) means in particular that a gear change and a clutch disengagement are imminent, but the gear change and clutch disengagement are not actually carried out.

A permanent indication of an intention to shift is in particular a sign that the disengagement threshold is out of adjustment. A permanent indication of an intention to shift can also exist if the clutch is disengaged or a gear change has taken place and an intention to shift continues to be indicated during a predetermined sixth time period.

An emergency adaptation of the disengagement thresholds is preferable performed only for those thresholds where a predetermined third condition was found to be present or for a group of disengagement thresholds to which the threshold belongs that was emergency-adapted, or for all disengagement thresholds if at least one of the disengagement thresholds was emergency-adapted.

With particular preference, at least one of the disengagement thresholds is set higher in an emergency adaptation if a permanent indication of an intention to shift was detected.

As another preferred embodiment, the invention provides a method for controlling a sixth characteristic operating value of a motor vehicle power train, wherein the contact point position of a clutch device is used under predetermined conditions for the control of the sixth characteristic operating value. The contact point position is stored and is subject to adaptation under predetermined conditions. The invention provides that under predetermined conditions, a creep mode of the clutch device is initiated. A creep mode works in particular in such a way that the degree of engagement of the clutch device is increased in accordance with a predetermined characteristic so that the amount of transmissible torque increases. This operating mode is used in particular when the vehicle is standing still or is moving at a slow speed while the engine is running and the brake, in particular the service brake, is substantially disengaged and the clutch device is substantially out of engagement or transmitting a substantially small amount of torque, and while a gear is engaged in the transmission, so that the transmission can transmit a torque.

Moving the clutch into engagement results in an increase of the engine torque. With preference, the creep mode is performed until the engine torque has reached a predetermined level, for example 10 Nm.

Embodiments of the invention preferably include a sensor device to detect the engagement position of a clutch-actuating element. Dependent on the detected and indicated actuating position of the clutch-actuating element, the clutch torque or the rise in the clutch torque is controlled. The control of the clutch torque includes in particular the creep mode. As a preferred concept under the invention, a correlation characteristic is provided which correlates predetermined detected and indicated positions of the clutch-actuating element with specific amounts of transmissible clutch torque.

According to the invention, the stored contact point is changed, in particular adapted, if the transmissible clutch torque exceeds a predetermined threshold value during a creep phase.

This feature of the invention offers in particular the possibility to correct an out-of-adjustment condition of the contact point position or the stored contact point position.

A sixth characteristic operating value in the sense of the present invention is in particular the amount of transmissible clutch torque or the target value for the transmissible clutch torque or the engagement position of the clutch device.

The invention proposes in particular a method of controlling at least a sixth characteristic operating value of a motor vehicle power train, wherein a creep phase is initiated or performed and wherein the engine torque is monitored. The invention further provides the concept of evaluating under predetermined conditions, whether the change of the engine torque during a predetermined time period corresponds to the change of the targeted transmissible clutch torque during the same time period.

As a preferred concept, a transmissible clutch torque is controlled by means of a clutch-actuating element. The clutch-actuating element preferably has an actuator, typically with an electric motor. With particular preference, the actuating position of the clutch-actuating element are detected or monitored. The clutch-actuating element preferably controls the transmissible clutch torque in accordance with a correlation characteristic, under which an amount of transmissible clutch torque is correlated to each clutch-actuating position.

The transmissible clutch torque will conform to the target in particular if the correlation characteristic between the transmissible clutch torque and the position of the clutch-actuating element is correct. If this stored correlation characteristic is incorrect, the actual transmissible clutch torque can deviate from the targeted transmissible clutch torque. According to the invention, the correlation characteristic is preferably subject to adaptation.

As a preferred concept, the stored contact point or the correlation of the contact point with a position of the clutch-actuating element is changed or adapted after it was detected that the targeted change of the transmissible clutch torque during a seventh time period deviates by more than a predetermined limit from the engine torque change resulting from this control input. If not substantially all of the power delivered by the engine is flowing through the clutch device and if there are possibly other consumer devices using some of the power, this will be taken into account in the comparison of the amounts of torque.

Preferably, the contact point is modified in the sense of lowering the contact point position. With particular preference, the contact point is changed in steps if the changes of the engine torque detected during the creep phase do not correspond to the targeted changes of the transmissible clutch torque.

With particular preference, the contact point position is lowered dependent on the transmissible clutch torque, if deviations are detected during a predetermined time period between the changes of the engine torque and the changes of the targeted transmissible clutch torque.

The change of the contact point is performed preferably on the basis of a predetermined mathematical relationship.

With particular preference, the contact point position is lowered by an amount $\Delta_{cp}$ which is defined as $\Delta_{cp}=a\times(M_{tt}-M_{limit})$, wherein a is a predetermined factor, $M_{tt}$ is the targeted transmissible clutch torque, and $M_{limit}$ is a predetermined limit for the targeted transmissible clutch torque. If the targeted transmissible clutch torque is larger than $M_{limit}$, the contact point is lowered by $\Delta_{cp}$. It is possible to have a plurality of different predetermined values $M_{limit}$, so that the contact point is lowered in steps.

The reference or zero point for the position of the contact point is represented in particular by the fully engaged position of the clutch device.

The predetermined factor a is preferably selected as a=0.1.

In the present context, the terms "control" and "controlling" and their related word forms should be understood with the meanings of regulating and controlling as defined in DIN standards.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

Following below is a detailed explanation of the invention based on exemplary embodiments that are illustrated in the drawings, but are not meant as limitations on the invention, wherein.

DETAILED DESCRIPTION OF PREFERRED EMBODIMENTS

Figure 1:
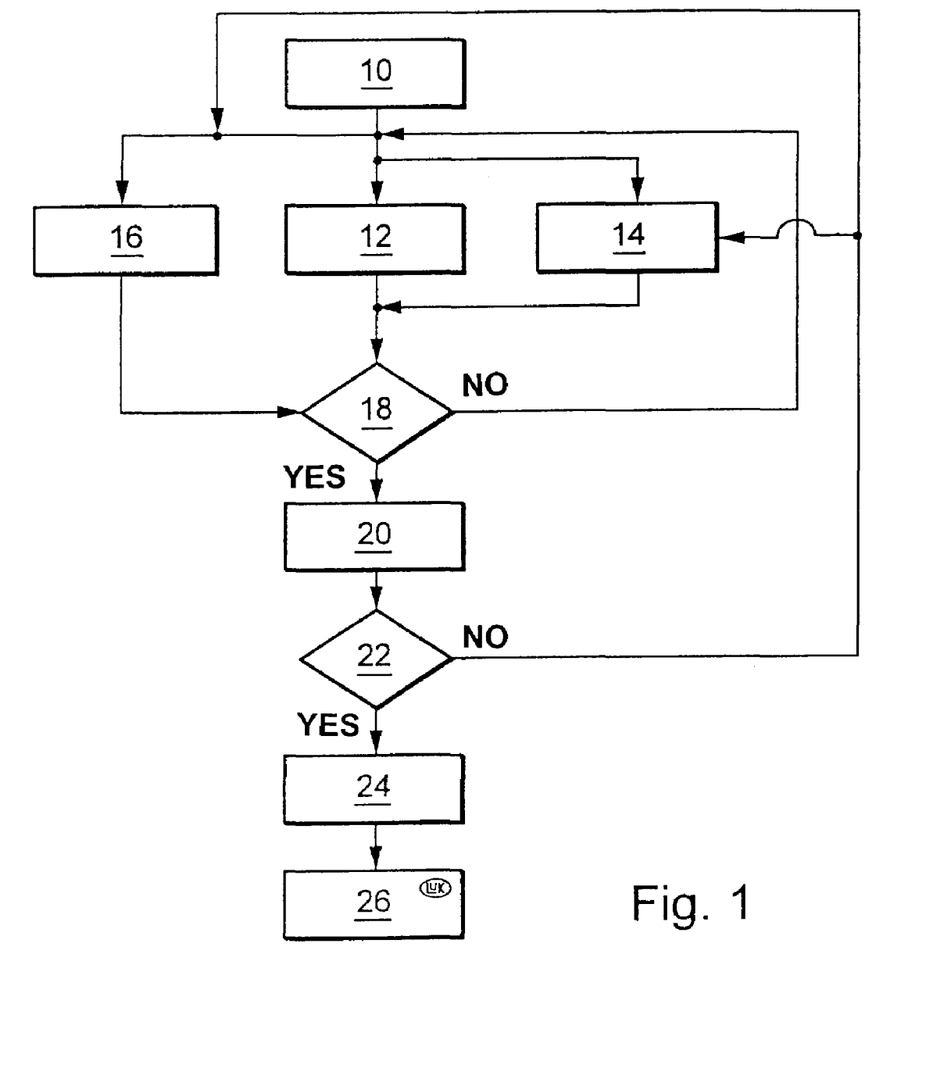
FIG. 1 represents a first example of an embodiment of the method according to the invention in a schematic flow-chart format.

FIG. 1 illustrates the steps of a method according to the invention in the form of a flowchart.

In step 10, the engine of the vehicle is started. In step 12, the power train or the engine is controlled in accordance with a predetermined warm-up characteristic. In particular, the engine rpm-rate is raised by about 300 to 400 rpm during the warm-up phase. Specifically, the idling rpm-rate is raised by 300 to 400 rpm in comparison to other time periods.

In step 14, at least one predetermined first characteristic operating value such as the transmissible clutch torque is controlled in a control mode that is independent of second characteristic values that may be subject to adaptation during this operating phase, such as the contact point or the friction coefficient of the clutch.

In step 16, the cooling fluid temperature is monitored.

In step 18, the cooling fluid temperature is evaluated as to whether or not it exceeds a predetermined first limit for the cooling fluid temperature. In the affirmative case, the warm-up phase is terminated in step 20.

In the negative case of step 18, the method loops back through steps 12, 14, 16.

In step 22, the cooling fluid temperature is evaluated as to whether or not it exceeds a predetermined second limit. In the negative case of step 22, the method loops back through steps 12, 14, 16. In the affirmative case, the adaptation lock is terminated in step 24, so that from this point on the first characteristic operating value is controlled dependent on adapted second characteristic operating values.

In step 26, the current operating phase is terminated by switching off the ignition.

Figure 2:
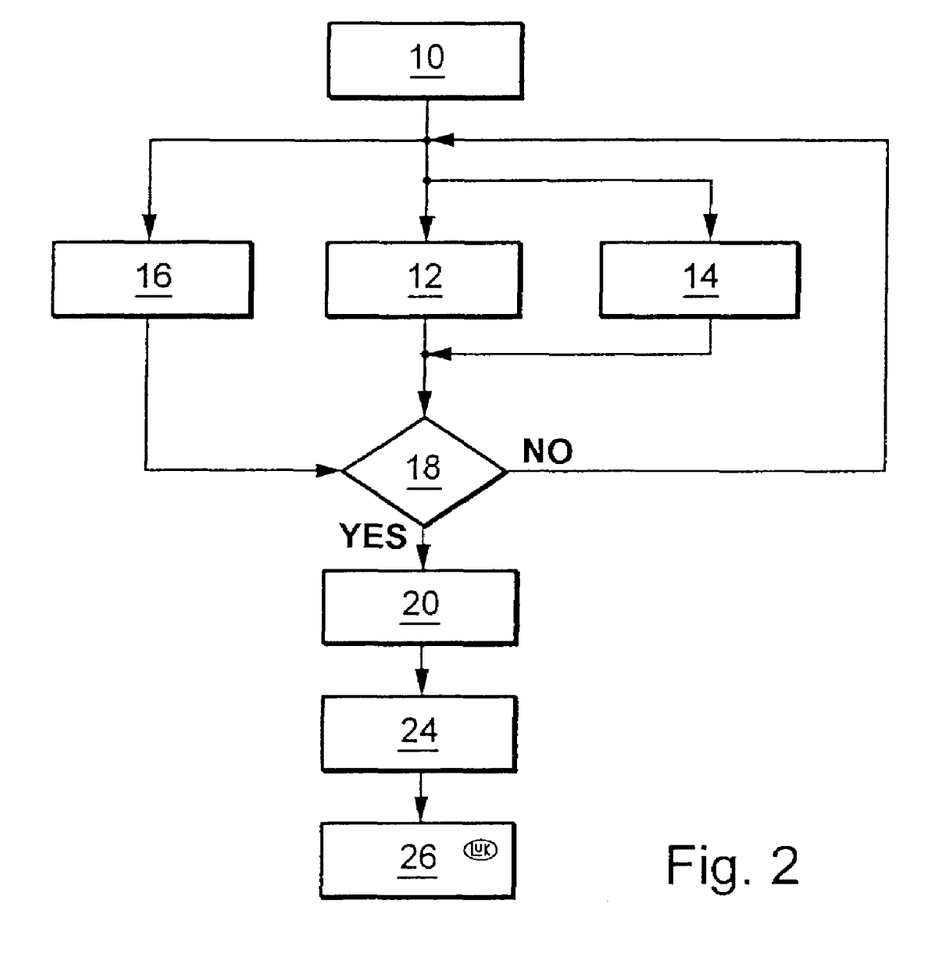
FIG. 2 represents a second example of an embodiment of the method according to the invention in a schematic flow-chart format.

FIG. 2 represents a second example of an embodiment of the inventive method in schematic flowchart format.

The method represented schematically in FIG. 2 is distinguished from the method of FIG. 1 in particular by the absence of step 22. Accordingly, if the result of step 18 is that the cooling fluid temperature exceeds a predetermined first limit for the cooling fluid temperature, the warm-phase is terminated and the adaptation lock is lifted. In particular the latter two events occur simultaneously.

Figure 3:
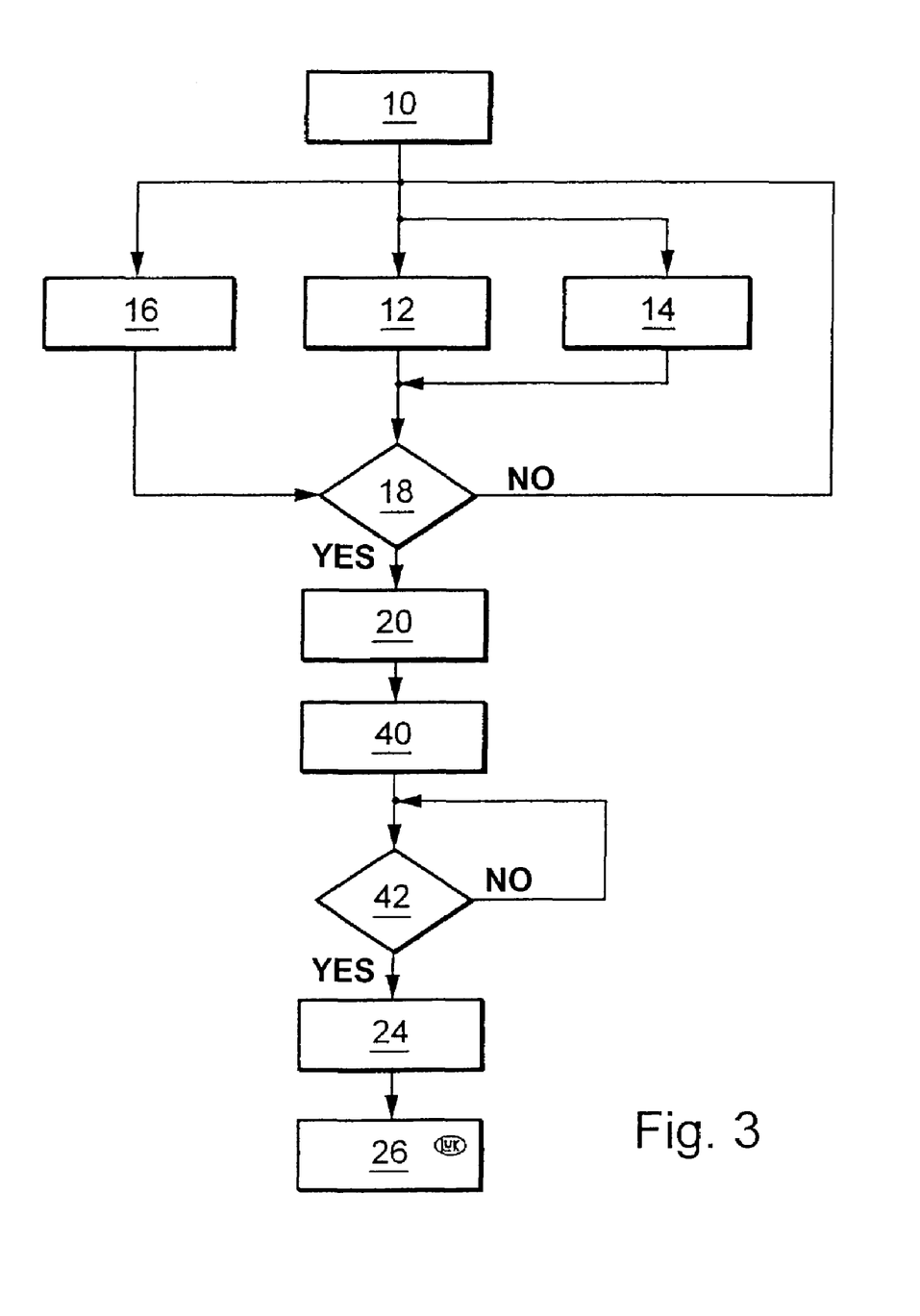
FIG. 3 represents a third example of an embodiment of the method according to the invention in a schematic flowchart format.

The method according to FIG. 3 is distinguished from the method of FIG. 2 in particular by the fact that substantially at the termination of the warm-up phase in step 20, a timer is started in step 40.

The timer count is evaluated in step 42 as to whether the time period from the timer start exceeds a predetermined time limit. The method is continued, i.e., the adaptation lock is lifted in step 24 only if step 42 is affirmative.

Figure 4:
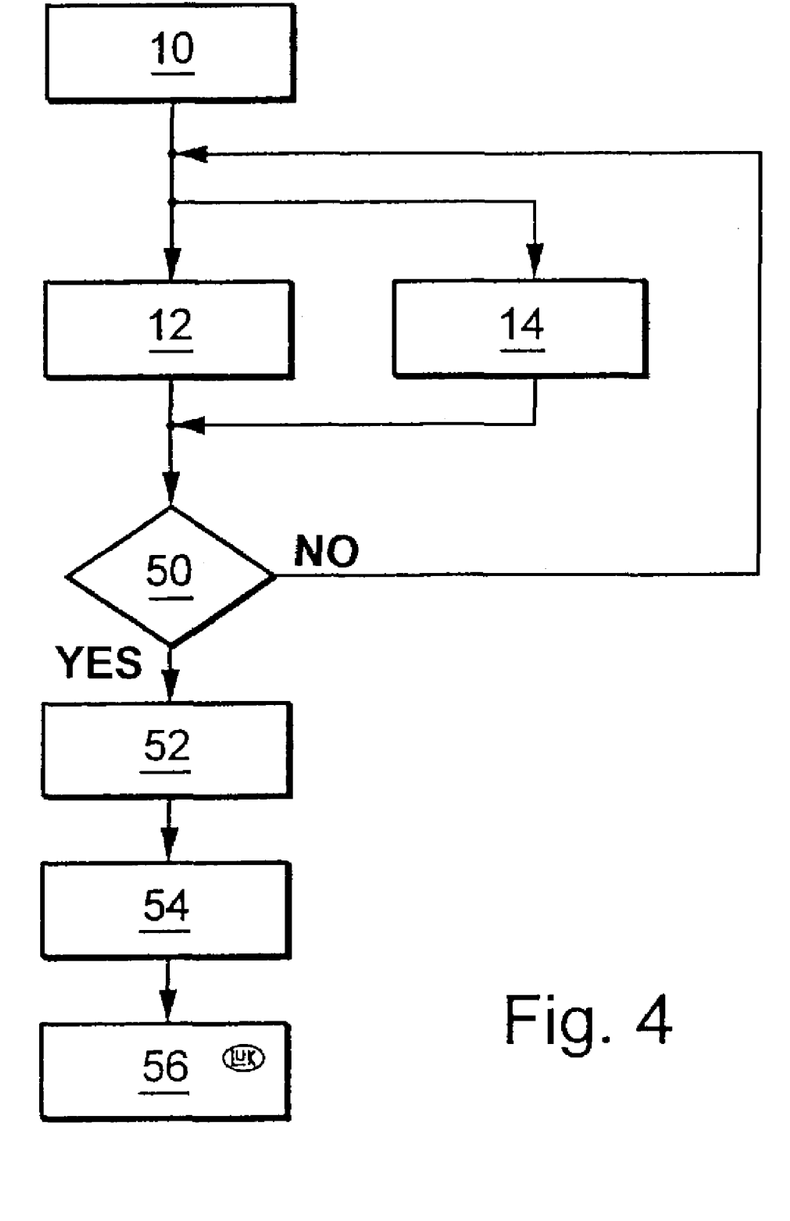
FIG. 4 represents a fourth example of an embodiment of the method according to the invention in a schematic flow-chart format.

The method according to FIG. 4 is started by switching on the ignition of the vehicle in step 10. At this time, a warm-up phase is started and initiated in step 12. In particular, during the warm-up phase the rpm-rate of the combustion engine is raised according to a predetermined warm-up characteristic in comparison to target rpm-rates that are set by characteristics which become operative in subsequent periods of the same operating phase. For example, the rpm rate in an Otto-cycle engine is raised by 300 rpm, so that in particular the idling rpm-rate is raised by 300 rpm. In a Diesel engine, the rpm-rate during the warm-up phase is preferably raised by about 400 rpm.

In step 14, an adaptation lock is set. The adaptation lock has the effect that the control of a first characteristic operating value occurs independently of second characteristic operating values that are subject to adaptation during the same operating phase of the motor vehicle.

In step 50, a test is made as to whether certain criteria are met under which the warm-up phase can be terminated. The predetermined criteria can be, for example, that a predetermined time period has elapsed from the time the engine was started or that a predetermined characteristic operating value such as the cooling fluid temperature is below a predetermined threshold, or some other criterion.

In the negative case of step 50, the method loops back through the steps 12, 14, i.e., the warm-up phase is continued. In the affirmative case of step 50, the warm-up phase is terminated in step 52 and the engine rpm-rate is lowered from its elevated value.

In step 54, where the engine rpm-rate is no longer raised in accordance with the warm-up characteristic, the adaptation lock is lifted, so that the first characteristic operating value represented, e.g., by the transmissible clutch torque, is controlled dependent on second characteristic operating values which in this operating phase are being adapted in accordance with a predetermined characteristic. The predetermined characteristic can be such that adaptations take place in predetermined time intervals or when predetermined conditions or malfunctions are detected.

In step 56, the ignition is switched off and the operating phase is thereby terminated.

It should be noted that the time period between the lifting of the adaptation lock and the switching-off of the ignition can in principle be of an arbitrary length and depends on the driver of the vehicle. The same is true for the methods that are illustrated in the other drawing figures.

Figure 5:
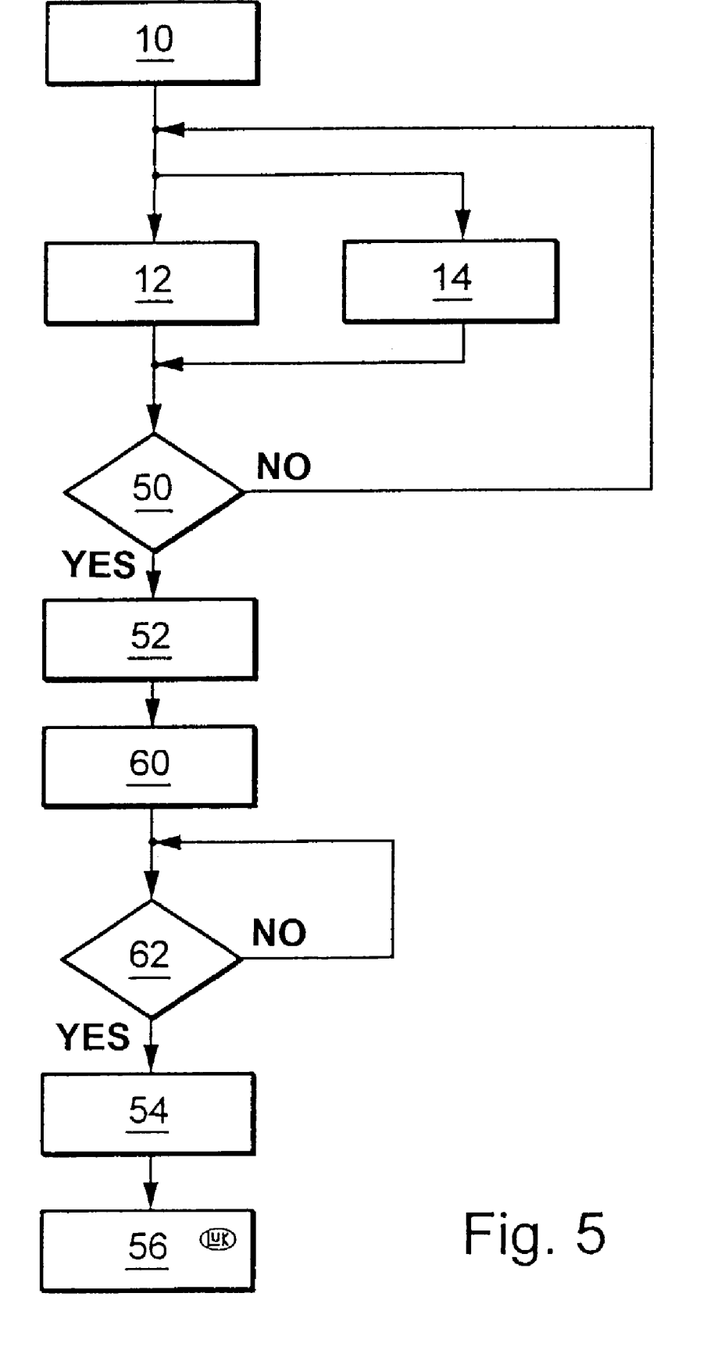
FIG. 5 represents a fifth example of an embodiment of the method according to the invention in a schematic flowchart format.

The method shown as an example in FIG. 5 is distinguished from the method of FIG. 4 in particular by the fact that as soon as the engine rpm-rate is no longer at the raised level of the warm-up characteristic, a timer is started in step 60.

The timer count is evaluated in step 62 as to whether the time period from the timer start exceeds a predetermined time limit. The method is continued, i.e., the adaptation lock is lifted in step 54 only if step 42 is affirmative. Thus, the adaptation lock is not lifted immediately at the end of the warm-up phase as it is in the method of FIG. 4, but with a time delay or time offset after the end of the warm-up phase.

Figure 6:
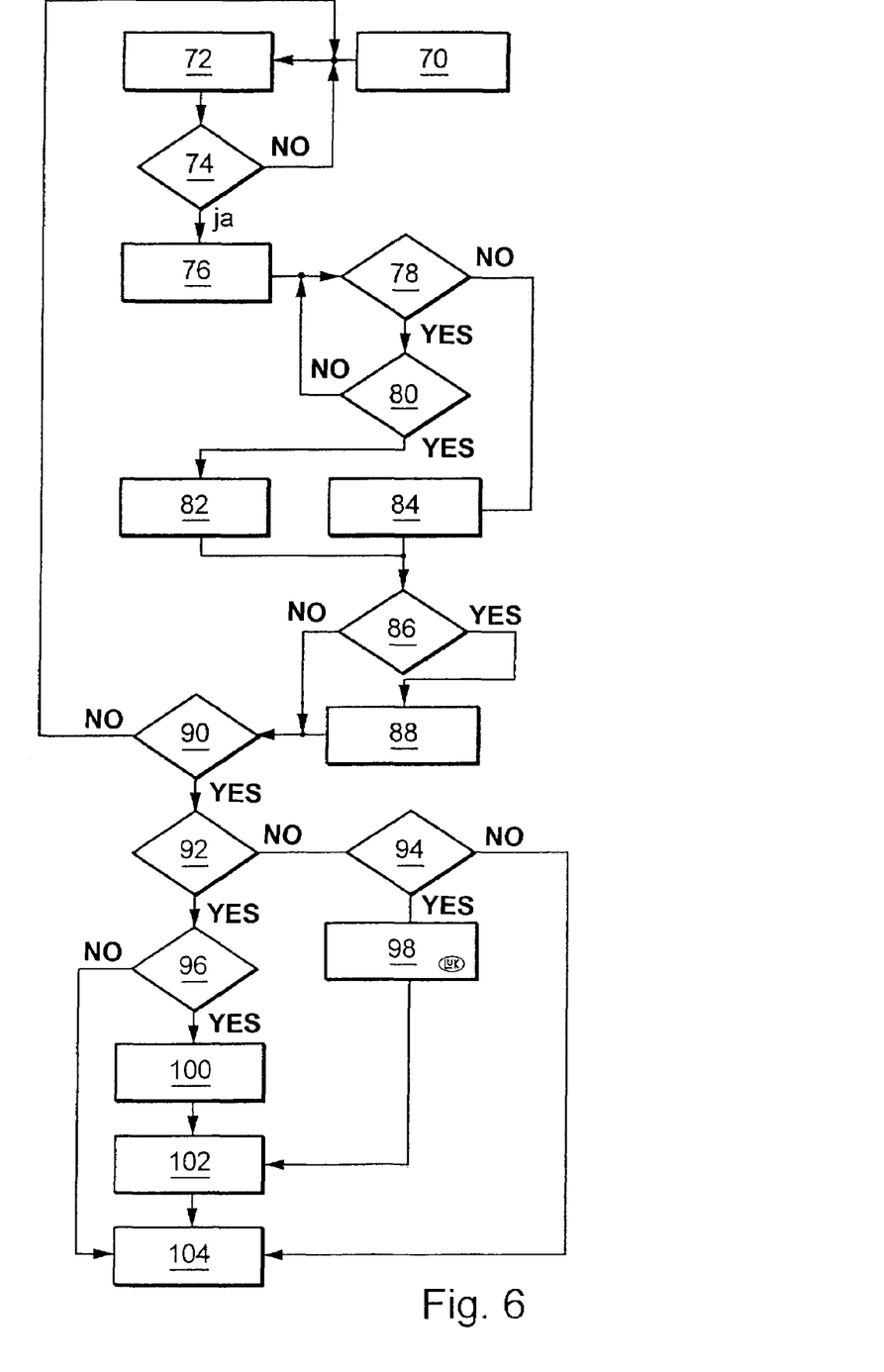
FIG. 6 represents a sixth example of an embodiment of the method according to the invention in a schematic flow-chart format.

FIG. 6 illustrates a further example of an embodiment of a method according to the invention in a schematic flowchart format.

An operating phase of the vehicle is started in step 70 by switching on the ignition.

During the operating phase, a fifth characteristic operating value of a motor vehicle can be controlled.

In step 72, movements of the transmission and movements of the shift lever are detected by at least two sensors, i.e., at least one sensor for each of the two movements. A connecting device is arranged between the respective places on the transmission and the shift lever where the movements or positions are detected. The connecting device is subject to elastic deformations under the application of a force or in predetermined gear-shifting situations.

Step 74 represents a test as to whether or not there is an indication that the driver intends to shift gears. An indication for such an intent exists in particular if the difference between the respective measured and appropriately normalized values at the transmission and the shift lever exceeds a predetermined threshold difference. In the negative case of step 74, the method loops back to step 72.

In the affirmative case of step 74, a timer is started in step 76. In step 78, a test is made as to whether the intention to shift is still present.

In the affirmative case of step 78, the timer count is evaluated in step 80 as to whether the time period from the timer start exceeds a predetermined time limit. If step 80 is negative, the method loops back to step 78.

If step 80 is positive, an emergency adaptation of the clutch disengagement thresholds is initiated and carried out in step 80. A disengagement threshold is in particular a predetermined difference between the respective normalized values measured by the position sensors at the transmission and at the shift lever. In this particular case, the disengagement threshold is a specific value of the difference that is indicative of an intention to shift.

If step 78 indicates that there is no longer an intention shift gears, the timer is set to zero in step 84.

After the emergency adaptation of the clutch disengagement thresholds in step 82 or the reset of the timer in step 84, a check is made in step 86 as to whether a gear shift was carried out or the clutch was taken out of engagement.

If step 86 is affirmative, a shift counter is incremented by 1 in step 88. The shift counter indicates the number of gear changes during the operating phase. The indication can be designed so that the sum of all shift processes is indicated independently of which gears were shifted, or it can be designed so that the shifts are counted separately according to gear groups that the individual gear levels are assigned to, or it can be designed to keep count separately for each of the gears to indicate how often it was shifted into.

In the negative case of step 86, the method continues directly with step 90.

Step 90 represents a test as to whether or not the operating phase is to be terminated.

If step 90 is negative, the method loops back to step 72.

It should be noted that step 72 can also be performed in parallel with the other steps of the method.

In the affirmative case of step 90, a review is made in step 92 as to whether or not emergency adaptations were performed in the current operating phase of the motor vehicle.

If no emergency adaptation of a clutch disengagement threshold took place during the current operating phase, the shift counter is evaluated in step 94 as to whether the number of gear shifts performed in the current operating phase is larger than a predetermined threshold number n. The threshold number n can relate to the total number of gear shifts, or to shifts in a certain group of gears, or to specific gear levels. If the number n relates to specific groups of gears or to specific individual gears, it is possible to set different threshold numbers n for the different gear groups or individual gears.

If step 92 is affirmative, a further test is made in step 96 that is analogous to step 94 except that the threshold number in step 96 is a positive integer k that is less than n, i.e., 0<k<n.

If step 94 or 96 is negative, i.e., if the number of shifts in the operating phase was smaller than the applicable threshold value n or k, the ignition is switched off in step 104 and the operating phase is thereby terminated.

If step 94 is affirmative, the method proceeds to step 98 where a limit is set for a maximum amount by which the clutch disengagement threshold is allowed to be changed in the subsequent adaptation that takes place in step 102.

After the adaptation has been carried out in step 102, the ignition is switched off and the operating phase is thereby terminated.

In the affirmative case of step 96, i.e., if the number of gear shifts is at or above the limit for performing an emergency adaptation, the method proceeds to step 100 where a limit is set for a maximum amount by which the clutch disengagement threshold is allowed to be changed in the subsequent adaptation that takes place in step 102. The limit set in step 100 is larger than the limit set in step 98.

The limits set in step 98 as well as in step 100 are of finite magnitude.

Figure 7:
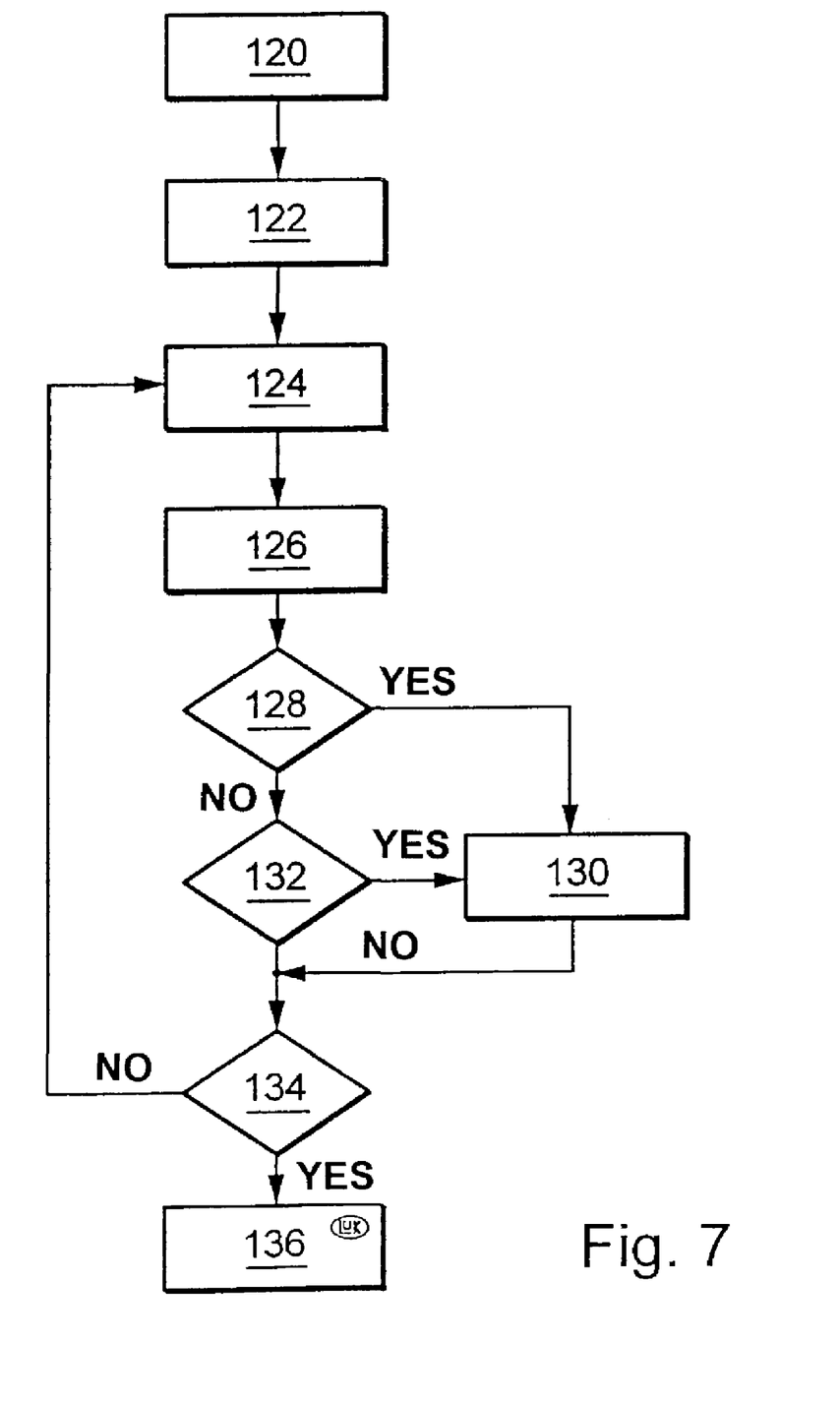
FIG. 7 represents a seventh example of an embodiment of the method according to the invention in a schematic flow-chart format.

FIG. 7 illustrates a further example of a method according to the invention.

In step 120, a creep phase is initiated if predetermined conditions are present that are indicative of the need for a creep phase. The predetermined conditions are in particular:
the vehicle speed is smaller than a predetermined vehicle speed, or the vehicle is standing still,
a gear is engaged,
the brake, in particular the service brake or the parking brake, is not actuated,
the accelerator pedal is not actuated,
the engaged gear is a start-up gear such as first, second or reverse gear.

In step 122, a timer is started.

In step 124, a creep phase is performed, meaning that a clutch torque or a control target for the clutch torque is built up in a ramp-shaped time profile according to a predetermined creep characteristic, which causes an increasing degree of engagement of the clutch device.

During step 124, the clutch torque is monitored in step 126, preferably by monitoring the amount of displacement of a clutch actuating element or other element in the actuating chain.

Step 128 represents a test as to whether or not the clutch torque is larger than a predetermined limit that was set for the clutch torque.

In the affirmative case of step 128, the conclusion is made in step 130 that the contact point of the clutch is out of adjustment, and the contact point is adjusted in step 130. The procedure for this is in particular that the contact point is set lower and that instead of the previously stored contact point, the adjusted (i.e., lowered) contact point is stored. The lowering of the contact point position can be performed in steps of predetermined equal amounts or according to a formula which may be of a linear or of some other character, or the adjustment may be performed in some other way.

For example, a differential amount $\Delta_{cp}$ may be subtracted from the stored contact point position according to the formula $\Delta_{cp}=a\times(M_{tt}-M_{limit})$, wherein the factor a is preferably set at 0.1 mm per Nm. For example, if $M_{limit}=25$ Nm and $M_{tt}>25$ Nm, the correction is calculated as $\Delta_{cp}=a\times(M_{tt}-25)$ [mm].

In the negative case of step 128, the method proceeds to step 132, where the timer is evaluated as to whether or not the indicated time period is longer than a predetermined time limit.

In the affirmative case of step 132, the method proceeds to step 130 for an adjustment of the contact point position.

In the negative case of step 132, the method proceeds to step 134 for a test as to whether or not a condition is met for terminating the creep phase. An appropriate condition for this is in particular that, since the initiation of the creep phase, the engine torque has increased by a predetermined amount such as, e.g., 10 Nm.

In the negative case of step 134, the method loops back to continue at step 124.

After the contact point position has been changed in step 130, the method continues at step 134.

In the affirmative case of step 134, the creep phase is terminated in step 136 and the power train—or more specifically, the characteristic operating values including the transmissible clutch torque—are subsequently controlled under another characteristic that is different from a creep characteristic.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of controlling a motor vehicle power train with an engine and a clutch comprising the steps of:
controlling the engine in accordance with a predetermined warm-up characteristic; and
during a warm-up phase, controlling a transmissible clutch torque in a control mode that is independent of a touchpoint of the clutch that is adaptable during the control mode,
wherein the warm-up characteristic is controlled by monitoring a cooling fluid temperature of the engine.

2. The method of claim 1, further including the step of:
evaluating whether the cooling fluid temperature exceeds a predetermined first limit for the cooling fluid temperature.

3. The method of claim 2, wherein if the cooling fluid temperature exceeds the predetermined first limit, then the warm-up phase is terminated.

4. The method of claim 1, further including the step of:
evaluating whether the cooling fluid temperature exceeds a predetermined second limit for the cooling fluid temperature.

5. The method of claim 4, wherein if the cooling fluid temperature is less than the predetermined second limit, the steps of controlling the engine, controlling the transmissible clutch torque and monitoring the cooling fluid temperature of the engine are repeated.

6. The method of claim 4, wherein if the cooling fluid temperature is greater than the predetermined second limit, an adaptation lock is terminated and from this point forward in time, the transmissible clutch torque is controlled dependent on the adaptable touchpoint of the clutch.

* * * * *

UNITED STATES PATENT AND TRADEMARK OFFICE
CERTIFICATE OF CORRECTION

PATENT NO. : 7,056,262 B2  Page 1 of 1
APPLICATION NO. : 10/326853
DATED : June 6, 2006
INVENTOR(S) : Oliver Amendt et al.

It is certified that error appears in the above-identified patent and that said Letters Patent is hereby corrected as shown below:

In the Inventor's place of residence:

Please delete "Johannes Moosheimer, Bühe (DE)" and substitute

-- Johannes Moosheimer, Bühl (DE) --.

Signed and Sealed this

Thirty-first Day of October, 2006

JON W. DUDAS
*Director of the United States Patent and Trademark Office*